(12) United States Patent
Yager

(10) Patent No.: US 9,856,841 B2
(45) Date of Patent: Jan. 2, 2018

(54) FUEL INJECTOR

(71) Applicant: AVL Powertrain Engineering, Inc., Plymouth, MI (US)

(72) Inventor: James H. Yager, Northville, MI (US)

(73) Assignee: AVL Powertrain Engineering, Inc., Plymouth, MI (US)

( * ) Notice: Subject to any disclaimer, the term of this patent is extended or adjusted under 35 U.S.C. 154(b) by 345 days.

(21) Appl. No.: 14/704,144

(22) Filed: May 5, 2015

(65) Prior Publication Data

US 2015/0345454 A1 Dec. 3, 2015

Related U.S. Application Data

(60) Provisional application No. 62/005,342, filed on May 30, 2014.

(51) Int. Cl.
*F02M 47/02* (2006.01)
*F02M 47/04* (2006.01)
(Continued)

(52) U.S. Cl.
CPC ....... *F02M 47/043* (2013.01); *F02B 23/0663* (2013.01); *F02B 23/0696* (2013.01); *F02D 19/0689* (2013.01); *F02D 19/0692* (2013.01); *F02D 19/10* (2013.01); *F02M 21/0251* (2013.01); *F02M 21/0263* (2013.01); *F02M 21/0275* (2013.01); *F02M 43/04* (2013.01); *F02M 47/02* (2013.01);
(Continued)

(58) Field of Classification Search
CPC .... F02M 47/02; F02M 47/022; F02M 47/027; F02M 47/043; F02M 63/02

USPC .................................................. 239/533.8
See application file for complete search history.

(56) References Cited

U.S. PATENT DOCUMENTS 3,688,986 A * 9/1972 Guegan ............... F02M 47/06
                                                                 239/533.8
4,687,136 A    8/1987 Ozu et al.
(Continued)

FOREIGN PATENT DOCUMENTS

CA      2743043       8/2011
EP      1067284 A1    1/2001
(Continued)

OTHER PUBLICATIONS

European Office Action for EP15168422.2, dated May 8, 2017; 4 pages.
(Continued)

*Primary Examiner* — Ryan Reis
(74) *Attorney, Agent, or Firm* — Harness, Dickey & Pierce, P.L.C.

(57) ABSTRACT

A fuel injector is provided and may include an injector body and an injector valve. The injector body may define a longitudinally extending chamber and may include a first intake port, a second intake port and a fuel injection port. The injector valve may be disposed within the chamber and may include a longitudinally extending aperture in fluid communication with the longitudinally extending chamber. The injector valve may be configured to prevent fluid communication between the first intake port and the second intake port, and may be configured to prevent fluid communication between the fuel injection port and the second intake port.

22 Claims, 9 Drawing Sheets

(51) Int. Cl.
*F02M 63/02* (2006.01)
*F02M 61/04* (2006.01)
*F02M 61/18* (2006.01)
*F02M 43/04* (2006.01)
*F02M 55/00* (2006.01)
*F02B 23/06* (2006.01)
*F02M 21/02* (2006.01)
*F02D 19/06* (2006.01)
*F02D 19/10* (2006.01)
*F02M 63/00* (2006.01)

(52) U.S. Cl.
CPC ........ *F02M 47/022* (2013.01); *F02M 47/027* (2013.01); *F02M 47/04* (2013.01); *F02M 55/008* (2013.01); *F02M 61/04* (2013.01); *F02M 61/1893* (2013.01); *F02M 63/02* (2013.01); *F02M 63/0078* (2013.01); *F02M 2200/304* (2013.01); *F02M 2200/40* (2013.01); *Y02T 10/125* (2013.01); *Y02T 10/32* (2013.01); *Y02T 10/36* (2013.01)

(56) References Cited

U.S. PATENT DOCUMENTS

| | | | | |
|---|---|---|---|---|
| 4,986,472 A | * | 1/1991 | Warlick | F02M 57/021 239/533.8 |
| 5,398,875 A | * | 3/1995 | Sverdlin | F02M 57/02 239/533.8 |
| 6,062,533 A | * | 5/2000 | Kappel | F02M 47/027 239/91 |
| 6,152,109 A | * | 11/2000 | Melchior | F02M 47/02 123/447 |
| 6,793,161 B1 | * | 9/2004 | Fujita | F02M 47/02 239/533.2 |
| 6,837,450 B2 | * | 1/2005 | Boecking | F02M 47/027 239/533.2 |
| 7,028,918 B2 | | 4/2006 | Buchanan et al. | |
| 2009/0020631 A1 | | 1/2009 | Mashida et al. | |
| 2012/0152206 A1 | * | 6/2012 | Adachi | F02M 47/027 123/445 |
| 2013/0081593 A1 | | 4/2013 | Coldren | |
| 2013/0160741 A1 | | 6/2013 | Sommars et al. | |

FOREIGN PATENT DOCUMENTS

| | | |
|---|---|---|
| JP | H10220227 A | 8/1998 |
| JP | 2010265855 A | 11/2010 |
| JP | 2013087727 A | 5/2013 |
| JP | 2014015918 A | 1/2014 |

OTHER PUBLICATIONS

Extended European Search Report for Application No. 15168422.2, dated Oct. 22, 2015.

Westport HPDI Injector Tip Assembly. [Retrieved on May 24, 2016] Retrieved from the Internet.<URL:http://www.westport.com/images/concentric_needles_300×260.swf>.

Parche, Dr. Marcus. Diesel Engine-Efficieny and Emissions Research Conference Aug. 20-24, 2006. [Retrieved on May 25, 2016] Retrieved from the Internet. <URL: http://energy.gov/sites/prod/files/2014/03/f9/2006_deer_parche.pdf.> p. 15.

* cited by examiner

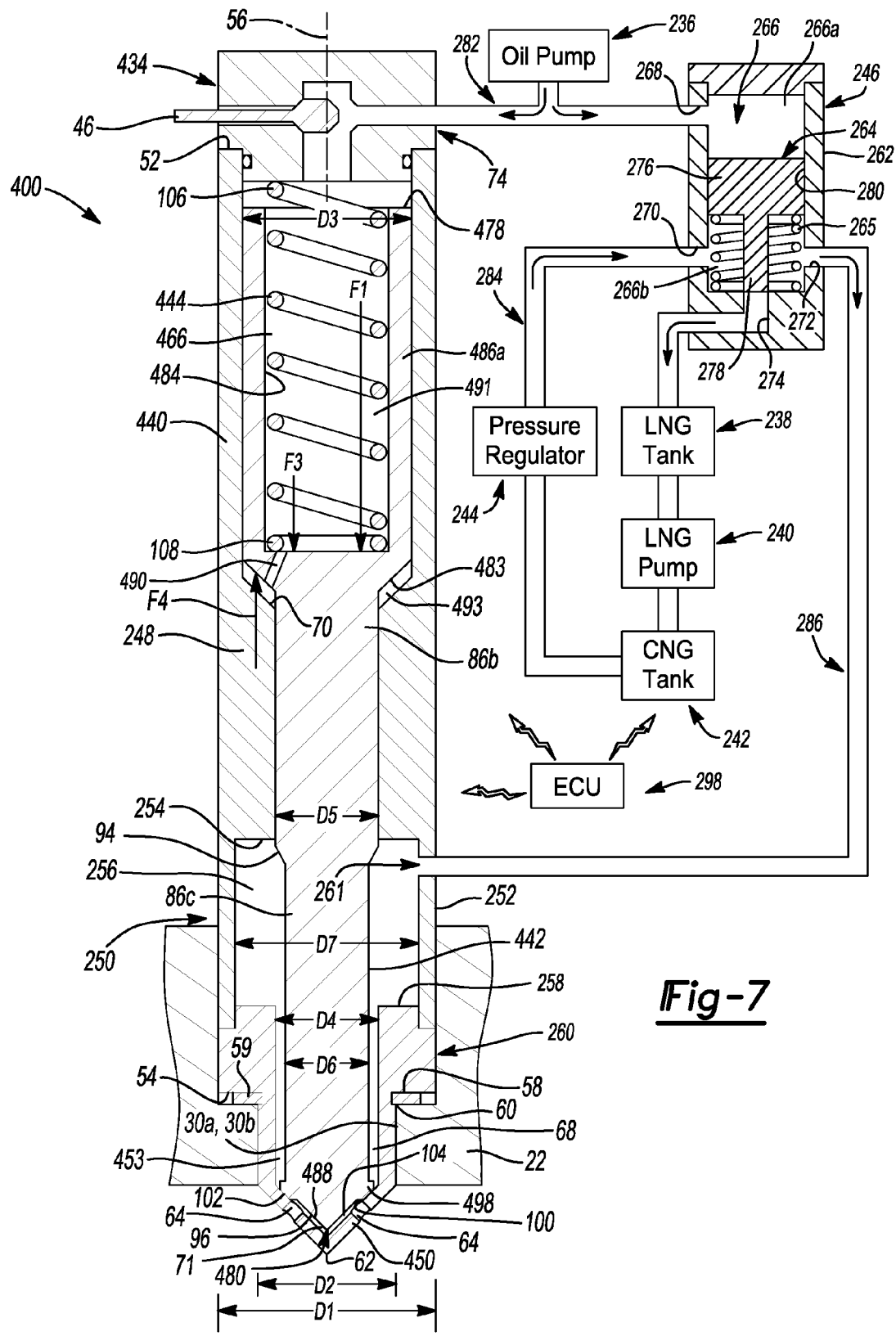

FUEL INJECTOR

CROSS-REFERENCE TO RELATED APPLICATIONS

This application claims the benefit of U.S. Provisional Application No. 62/005,342 filed on May 30, 2014. The entire disclosure of the above application is incorporated herein by reference.

FIELD

The present disclosure relates to a fuel injector. More particularly, the present disclosure relates to a high-pressure direct injector for natural gas.

BACKGROUND

This section provides background information related to the present disclosure which is not necessarily prior art.

Fuel injectors are used in a variety of applications to deliver a fuel, such as gasoline, to an engine. A series of fuel injectors may be incorporated into each of the various cylinders in the engine to deliver the fuel that will drive the pistons and power the engine. In some applications, it may be desirable to deliver a high-pressure natural gas to an engine via a fuel injector. In such instances, it may be desirable to have a fuel injector that can deliver fuel in multiple configurations and under various engine operating conditions and modes of operation.

SUMMARY

This section provides a general summary of the disclosure, and is not a comprehensive disclosure of its full scope or all of its features.

According to one particular aspect, the present disclosure provides a fuel injector. The fuel injector may include an injector body and an injector valve. The injector body may define a longitudinally extending chamber and may include a first intake port, a second intake port and a fuel injection port. The injector valve may be disposed within the chamber and may include a longitudinally extending aperture in fluid communication with the longitudinally extending chamber. The injector valve may be configured to prevent fluid communication between the first intake port and the second intake port, and may be configured to prevent fluid communication between the fuel injection port and the second intake port.

In some configurations, the fuel injector may include a biasing member disposed within the chamber. The biasing member may be configured to bias the injector valve into engagement with the injector body.

In some configurations, the fuel injector may include a biasing member disposed within the chamber. The biasing member may be configured to bias the injector valve into engagement with the injector body to prevent fluid communication between the at least one fuel injection port and the second intake port.

In some configurations, the injector valve may include an annular flanged portion. The annular flanged portion may be operable to engage the injector body to define a gap between the injector valve and the injector body.

In some configurations, the fuel injector may include a control valve. The control valve may be operable to prevent fluid communication between the first intake port and the chamber.

In some configurations, the first intake port is an oil intake port and the second intake port is a natural gas intake port.

In some configurations, the injector valve includes a longitudinally extending aperture.

In some configurations, the longitudinally extending aperture is in fluid communication with the longitudinally extending chamber.

In some configurations, the chamber includes first and second portions at least partially defined by the injector valve and the injector body. The injector valve may prevent fluid communication between the first and second portions.

In some configurations, the injector body includes a conically shaped end portion.

In some configurations, the injector valve includes a conically shaped tip portion disposed within the end portion.

In some configurations, the tip portion includes an annular flanged portion operable to engage the end portion.

According to another particular aspect, the present disclosure provides a fuel injector. The fuel injector may include an injector body and an injector valve. The injector body may define a longitudinally extending chamber and include a first intake port, a second intake port and at least one fuel injection port. The first intake port may be configured to deliver a first fluid into the chamber. The first fluid may apply a first force on the injector valve. The second intake port may be configured to deliver a second fluid into the chamber. The second fluid may apply a second force on the injector valve. The second force may oppose the first force. The injector valve may be disposed within the chamber and may be configured to prevent fluid communication between the first intake port and the second intake port.

According to yet another particular aspect, the present disclosure provides method for operating a fuel injector. The fuel injector including may include an injector body defining a longitudinally extending chamber, and an injector valve slidably disposed within the longitudinally extending chamber. The injector body may include a first intake port, a second intake port, and a fuel injection port. The injector valve may include a longitudinally extending aperture. The method may include allowing a first fluid to flow into the longitudinally extending chamber through the first intake port. The method may also include allowing the first fluid to flow into the longitudinally extending aperture to apply a first force on the injector valve in a first direction, such that the injector valve moves in the first direction within the longitudinally extending chamber and engages the injector body to prevent fluid communication between the second intake port and the at least one fuel injection port.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 6A:
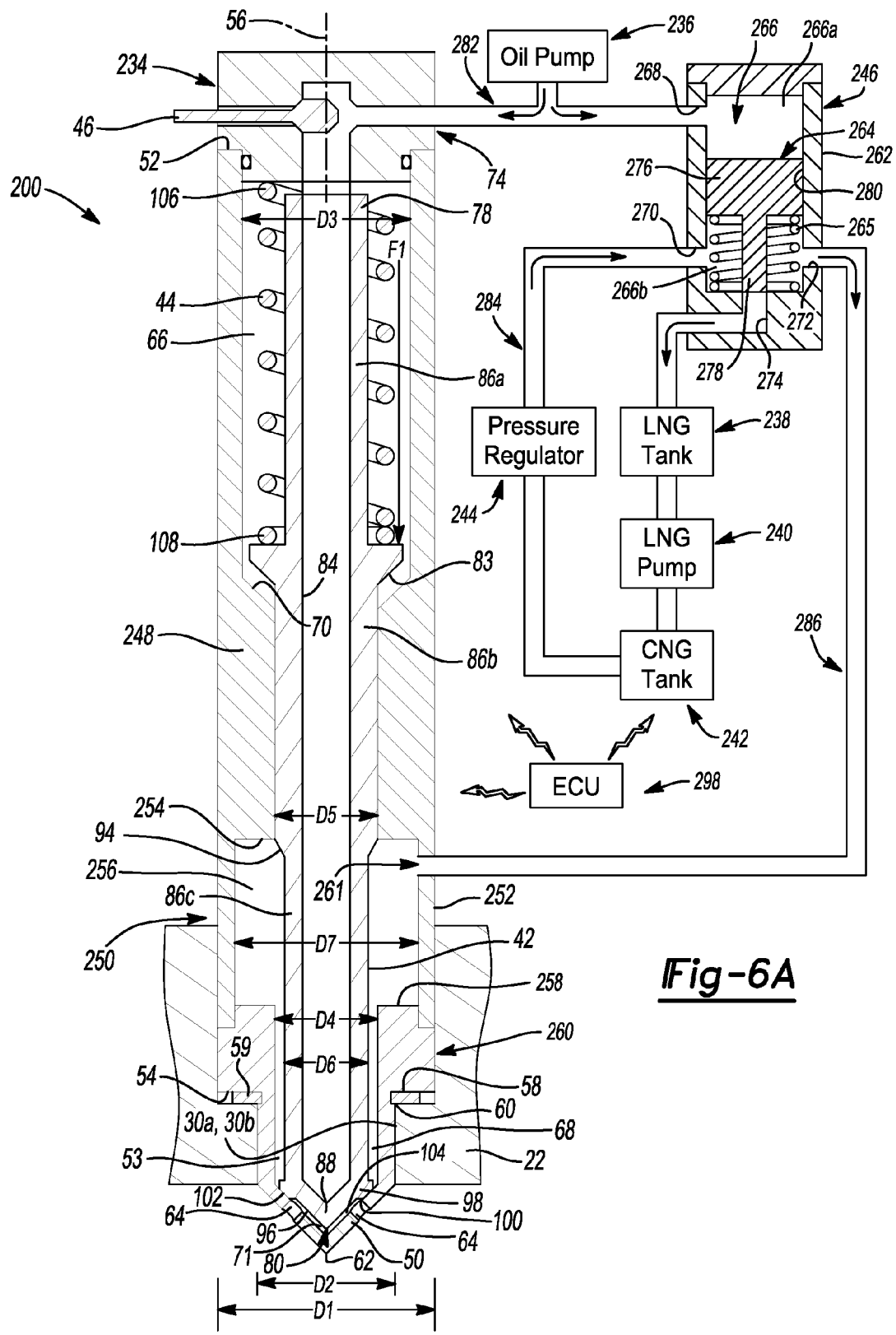
FIG. 6A is a schematic view of a fuel pressure regulating system, including a cross-sectional view of a fuel injector having an accumulator, in accordance with the principles of the present disclosure.
Figure 6B:
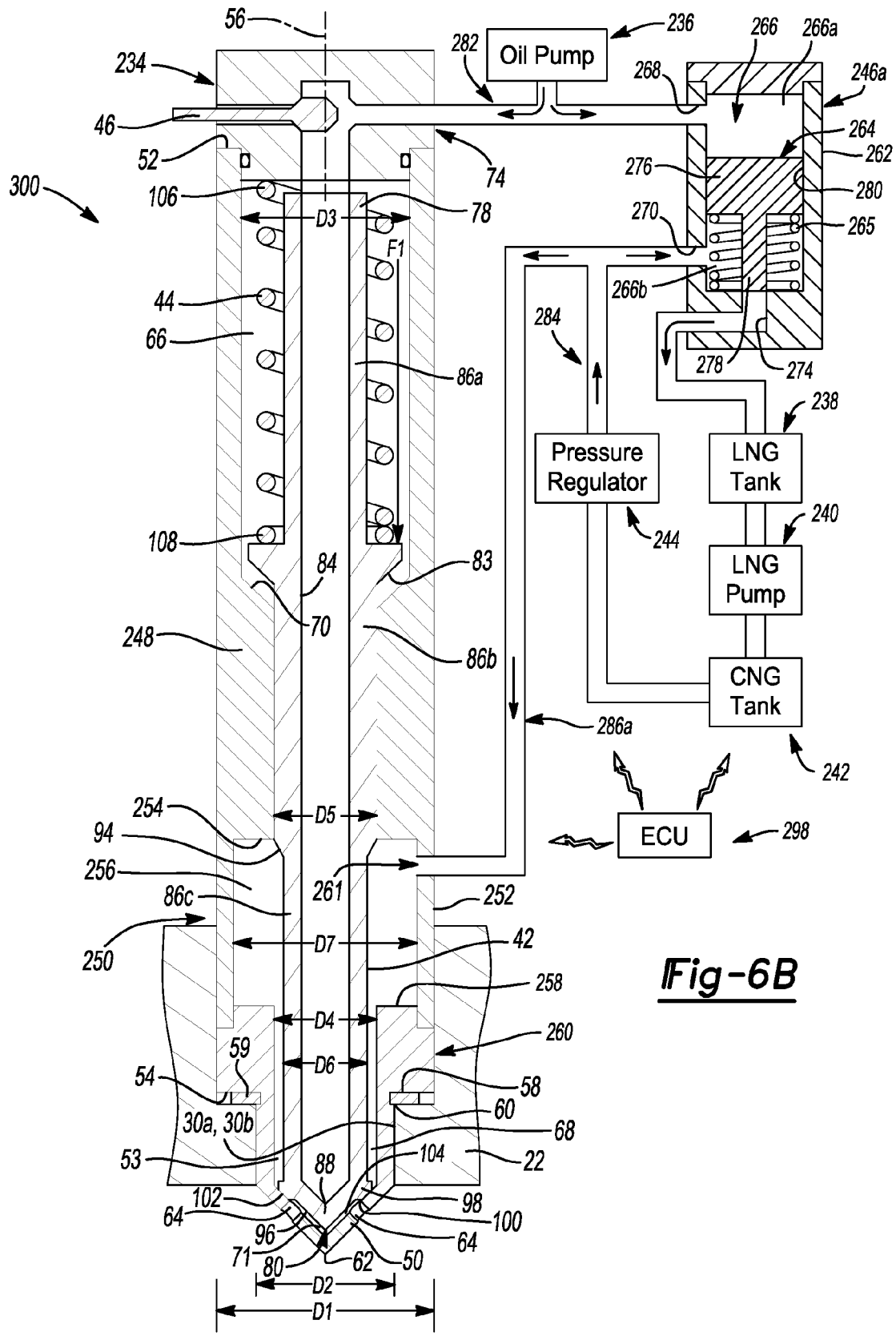

FIG. 6B is a schematic view of another configuration of a fuel pressure regulating system, including a cross-sectional view of a fuel injector having an accumulator, in accordance with the principles of the present disclosure; and FIG. 7 is a schematic view of another configuration of a fuel pressure regulating system, including a cross-sectional view of a fuel injector having an accumulator, in accordance with the principles of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
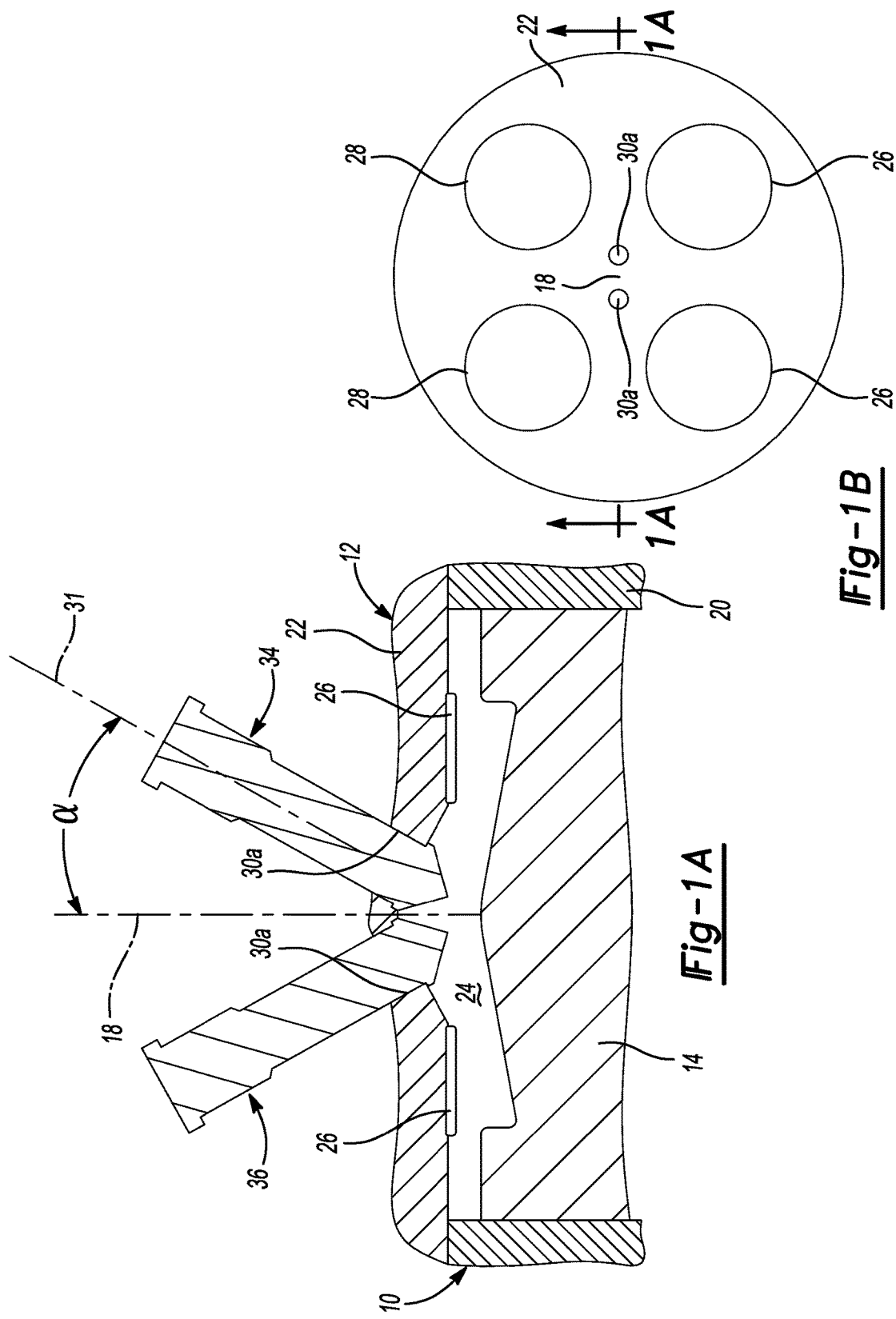
FIG. 1A is a cross-sectional view of a cylinder incorporating a fuel injector in accordance with the principles of the present disclosure.
FIG. 1B is a top view of the cylinder of FIG. 1A.
Figure 2:
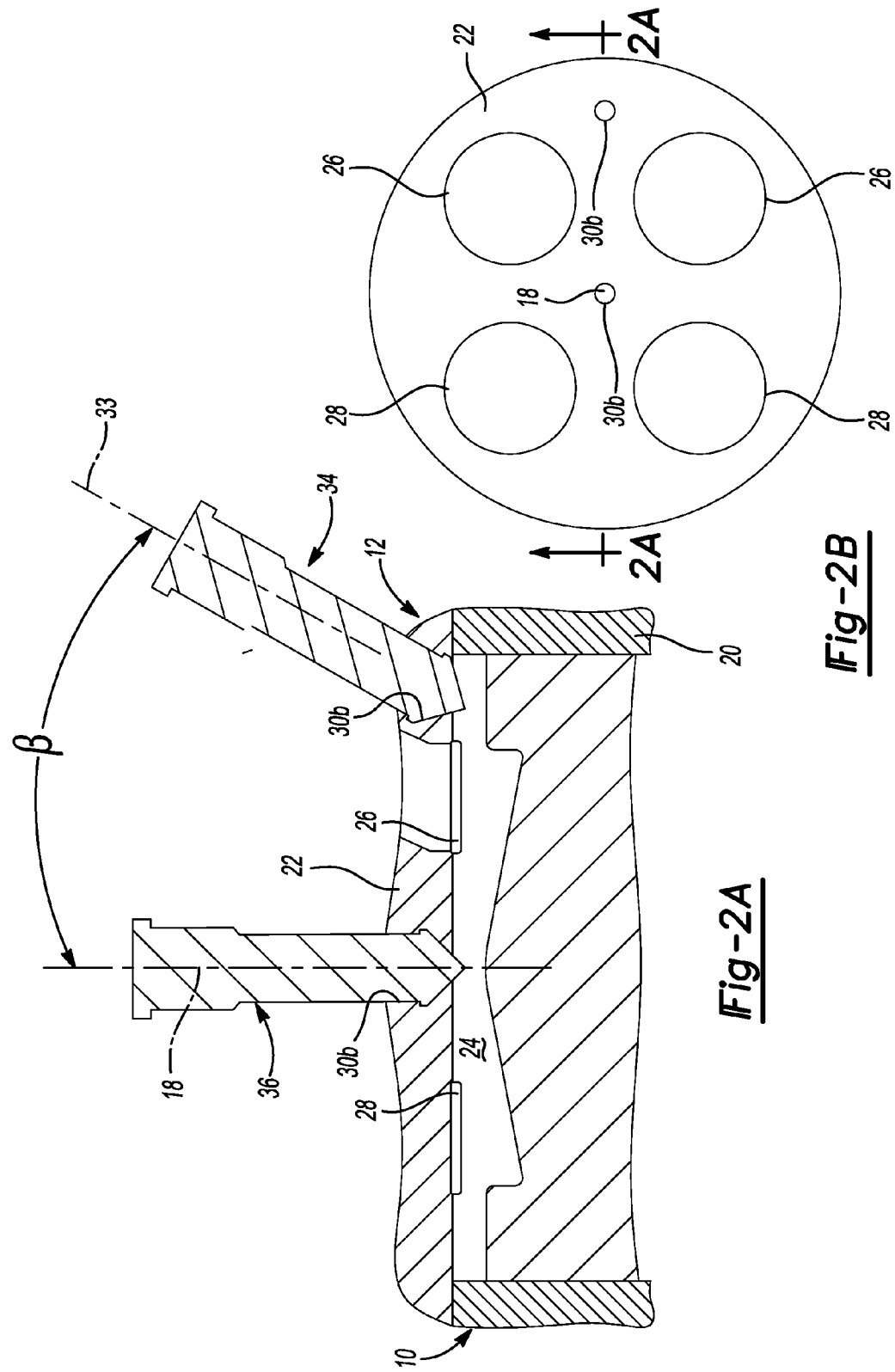
FIG. 2A is another cross-sectional view of a cylinder incorporating a fuel injector in accordance with the principles of the present disclosure.
FIG. 2B is a top view of the cylinder of FIG. 2A.
Figure 3:
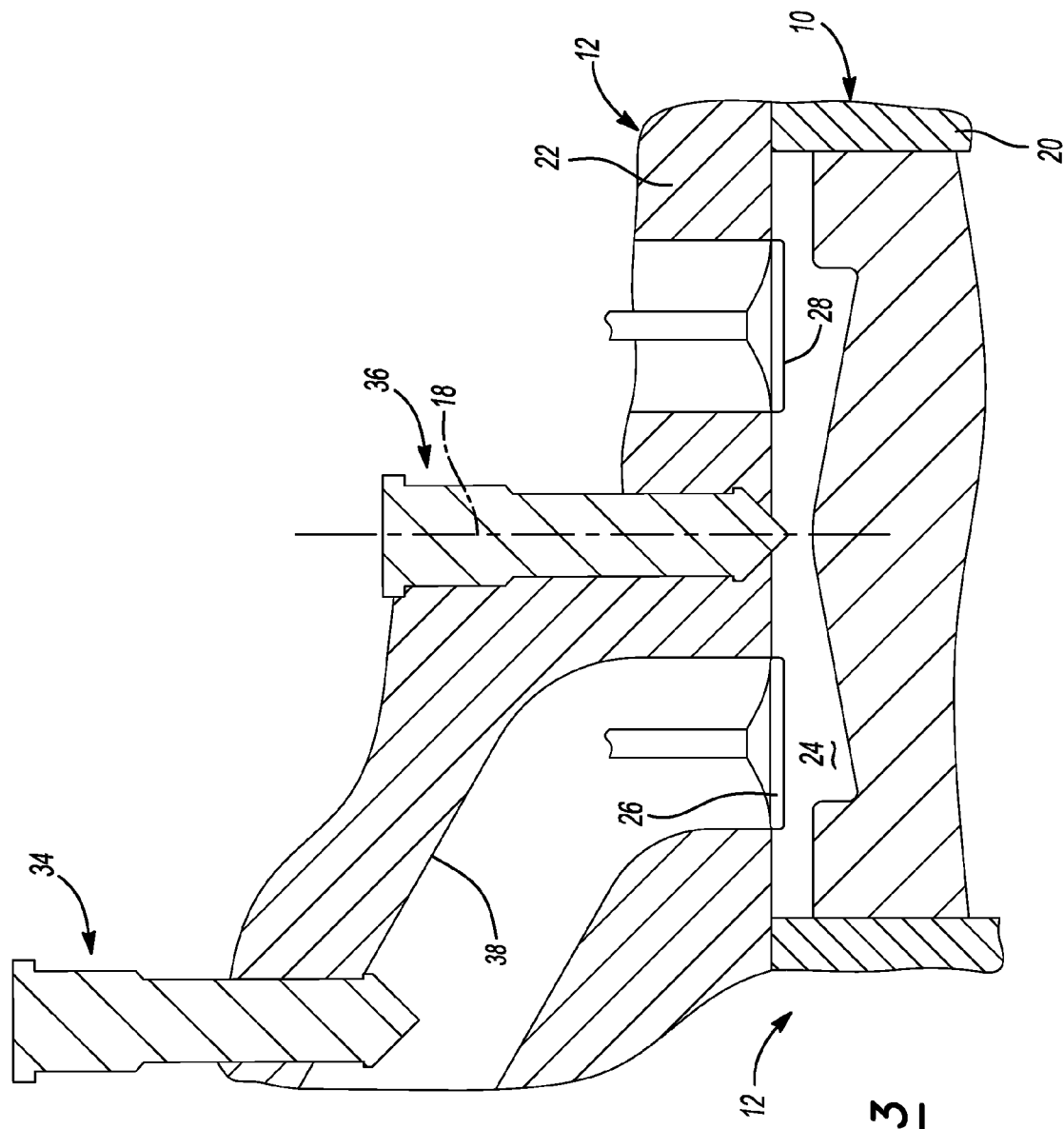
FIG. 3 is another cross-sectional view of a cylinder incorporating a fuel injector in accordance with the principles of the present disclosure.

With reference to FIGS. 1A, 2A and 3, an engine 10 is provided and may include a cylinder 12 and a piston 14. While only one cylinder 12 and one piston 14 are shown, it will be appreciated that the engine 10 may include any number of cylinders 12 and pistons 14, as is known in the art.

The cylinder 12 may include a cylinder block 20 and a cylinder head 22. The cylinder block 20 and cylinder head 22 may define a chamber 24 having a central, longitudinal axis 18. The piston 14 may slide or otherwise move along the central axis 18 within the chamber 24 to drive a crankshaft (not shown) and provide power to the engine 10. The cylinder head 22 may include at least one intake valve assembly 26 and at least one exhaust valve assembly 28. In one configuration, the cylinder head 22 includes two intake valve assemblies 26 and two exhaust valve assemblies 28. The intake valve assemblies 26 may deliver air from an intake source (not shown) to the chamber 24 while the exhaust valve assemblies 28 deliver combustion exhaust from the chamber 24 to an exhaust system (not shown).

At least one bore 30a may be formed in the cylinder head 22 or the cylinder block 20. With reference to FIGS. 1A and 1B, in one configuration, the cylinder head 22 includes two bores 30a located proximate to the central axis 18, and generally central to the intake valve assemblies 26 and the exhaust valve assemblies 28. A longitudinal axis 31 of one of the bores 30a may be disposed at an angle ($\alpha$) relative to the central axis 18.

With reference to FIGS. 2A and 2B, in another configuration, the cylinder head 22 includes two bores 30b. At least one of the bores 30b may be substantially aligned with the central axis 18, while another of the bores 30b may be disposed substantially adjacent to and between the intake valve assemblies 26. Accordingly, a longitudinal axis 33 of one of the bores 30b may be disposed at an angle (β) relative to the central axis 18.

The cylinder 12 may further include at least one fuel injector 34. The fuel injector 34 may be a high-pressure fuel injector that injects natural gas into the chamber 24 of the cylinder 12. While the fuel injector 34 is described as injecting natural gas, the fuel injector 34 may inject any other suitable fuel into the chamber 24.

With reference to FIGS. 1A and 2A, the fuel injector 34 may be disposed in one of the bores 30a, 30b while a diesel injector 36, a spark plug (not shown), or another suitable device (e.g., a micro-pilot) for igniting the fuel supplied by the fuel injector 34 may be disposed in the other bore 30a, 30b.

With reference to FIG. 3, in another configuration, the fuel injector 34 may be disposed within an intake port 38 of an engine 10. The intake port 38 may be in fluid communication with at least one intake valve assembly 26. Accordingly, the fuel injector 34 may deliver fuel to the chamber 24 via the intake port 38.

Figure 4A:
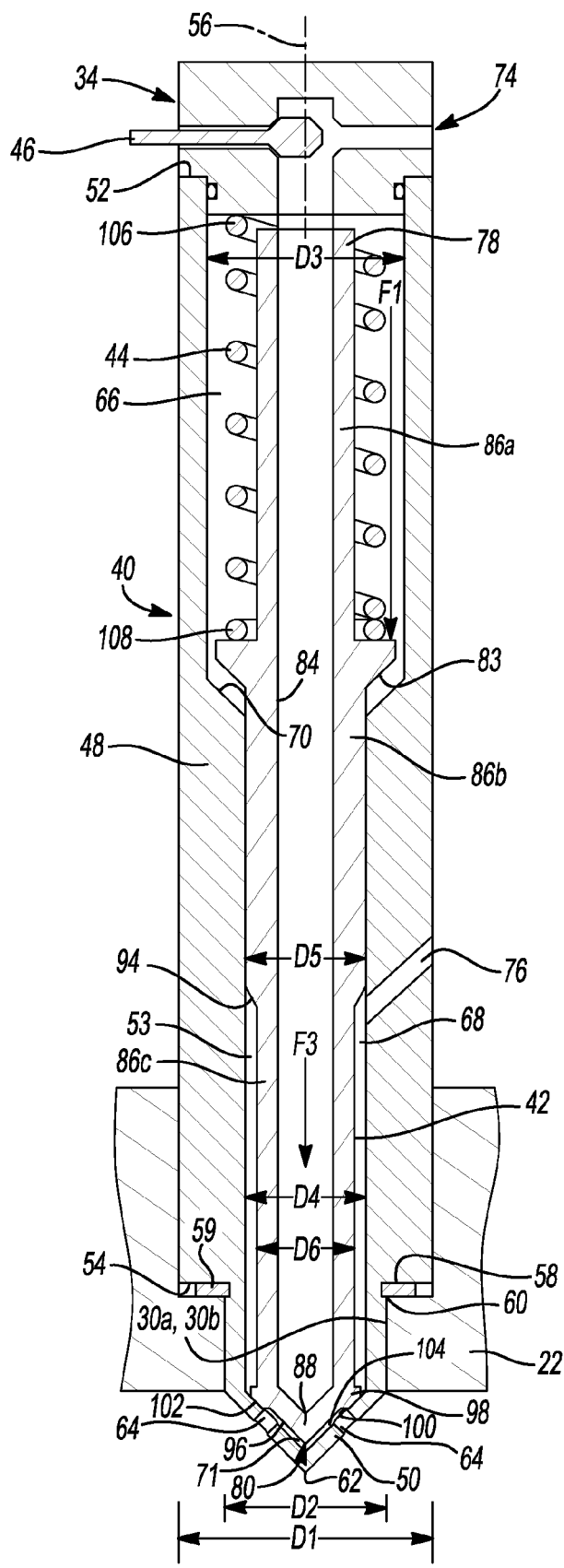
FIG. 4A is a cross-sectional view of a fuel injector in a first configuration in accordance with the principles of the present disclosure.
Figure 4B:
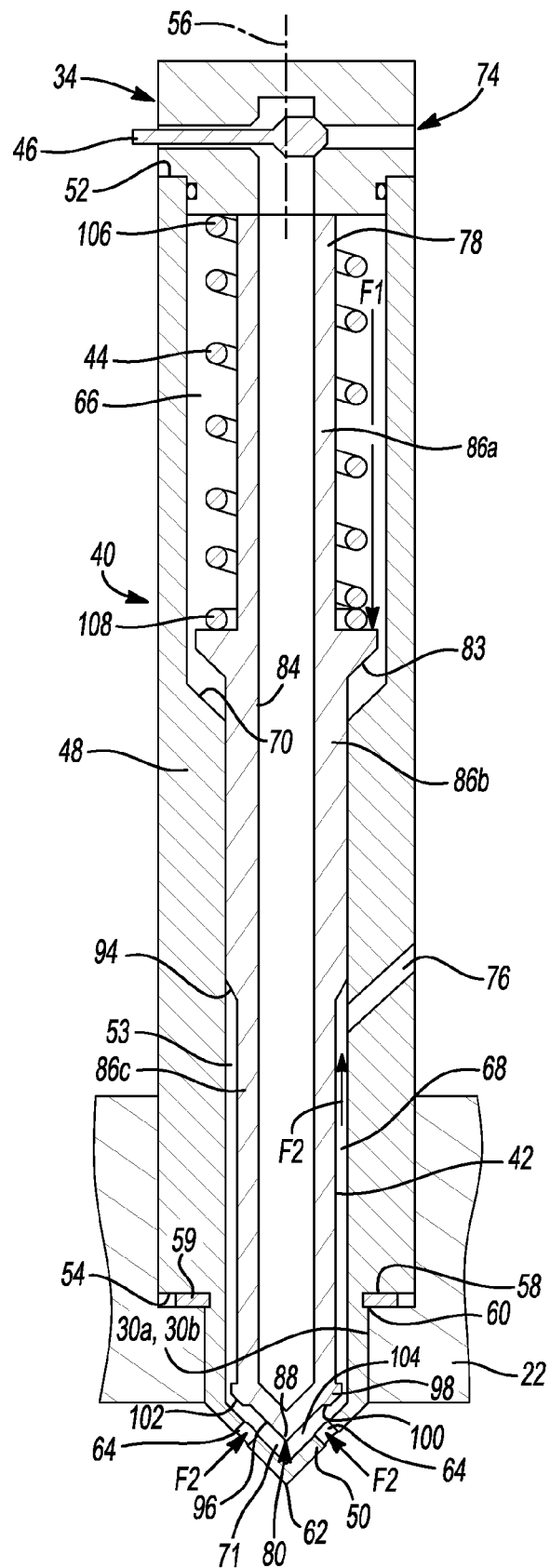
FIG. 4B is a cross-sectional view of the fuel injector of FIG. 4A in a second configuration.

With reference to FIGS. 4A and 4B, the fuel injector 34 will now be described in detail. The fuel injector 34 may include an injector body 40, a needle or injector valve 42, a biasing member 44, and a control valve assembly 46. The injector body 40 may include a base portion 48 and a tip portion 50. In one configuration, the base 48 and the tip 50 may define an inner chamber 53. The tip 50 may be fastened to the base 48 using a threaded configuration, a press-fit configuration, or by using other suitable mechanical fastening techniques. Alternatively, the tip 50 may be integrally formed with the base 48 in a monolithic construct.

The base 48 may extend from a proximal end 52 to a distal end 54 along a longitudinal axis 56. The distal end 54 may form an annular shoulder 58 extending between and connecting the base 48 and the tip 50. In this regard, the base 48 may be a generally cylindrical construct having a diameter D1, and the tip 50 may be a generally cylindrical construct having a diameter D2 (FIG. 4A). The diameter D1 may be larger than the diameter D2. In an assembled configuration, injector body 40 may be disposed within the bore 30 such that the shoulder 58 is disposed against a portion of the cylinder head 22 or a portion of the intake port 38. In one configuration, the injector 34 may include a gasket 59 or similar sealing feature disposed between the shoulder 58 and the cylinder head 22 to provide a sealed interface between the injector body 40 and the cylinder head 22.

The tip 50 may extend from a proximal end 60, adjacent the distal end 54 of the base 48, to a distal end 62 along the longitudinal axis 56. The distal end 62 of the tip 50 may be generally conically shaped. The tip 50 may include between two (2) and twelve (12) apertures or fuel injection ports 64 that provide fluid communication with the chamber 53. It will be appreciated that the number and configuration of the fuel injection ports 64 may vary depending on the particular use or application of the fuel injector 34.

The chamber 53 may extend along the longitudinal axis 56 and may include a first portion 66 and a second portion 68. An annular flange or shoulder 70 may extend between and connect the first portion 66 and the second portion 68. In this regard, the first portion 66 may be a generally cylindrical chamber having a diameter D3, and the second portion 68 may be a cylindrical chamber having a diameter D4 (FIG. 4A). The diameter D3 may be larger than the diameter D4. The conical configuration of the distal end 62 of the tip 50 may generally define a conical configuration at a distal end 71 of the chamber 53 thereof.

The injector 34 may further include a first intake port 74 and a second intake port 76. The first intake port 74 may be disposed in the control valve assembly 46 and may be in fluid communication with the first portion 66 of the chamber 53. The first intake port 74 may be a high-pressure oil supply port or, alternatively, may supply any suitable fluid to the first portion 66 of the chamber 53.

The second intake port 76 may extend through the injector body 40 and may be in fluid communication with the second portion 68 of the chamber 53. In one configuration, the second intake port 76 may be an aperture formed through a sidewall of the base 48. The second intake port 76 may be a high-pressure natural gas port or, alternatively, may supply any suitable fluid to the second portion 68 of the chamber 53.

The injector valve 42 may be located within the chamber 53 of the injector body 40 and translates within the chamber 53 in a direction substantially parallel to the longitudinal axis 56. The injector valve 42 may extend from a proximal end 78 to a distal end 80 along the longitudinal axis 56. The injector valve 42 may include first, second and third stem portions 86a, 86b, 86c and a tip portion 88. An annular flange or shoulder 83 may extend radially outward from the injector valve 42 between the first stem portion 86a and the second stem portion 86b. In one configuration, the shoulder 83 may be generally conically shaped. A longitudinally extending bore 84 may extend at least partially through the first, second and third stem portions 86a, 86b, 86c and the tip portion 88, such that at least a portion of the injector valve 42 is a generally hollow construct.

The second stem portion 86b may be separated from the third stem portion 86c by an annular shoulder 94. In this regard, the second stem portion 86b may be a generally cylindrical construct having a diameter D5, and the third stem portion 86c may be a cylindrical construct having a diameter D6 (FIG. 4A). The diameter D5 may be larger than the diameter D6 and may be substantially equal to the diameter D4 of the second portion 68 of the chamber 53. Accordingly, the second stem portion 86b of the injector valve 42 may be sealingly disposed within the second portion 68 of the chamber 53 such that the injector valve 42 prevents fluid communication between first and second portions 66, 68 of the chamber 53, and thereby prevents fluid communication between the first and second intake ports 64, 74. In addition, the injector 34 may include an annular space or gap between the third stem portion 86c and the injector body 40 at the second portion 68 of the chamber 53.

The tip portion 88 of the injector valve 42 may extend from the third stem portion 86c and may include a conically shaped surface 96, such that the tip portion 88 is receivable within the conically shaped distal end 71 of the chamber 53. The tip portion 88 may further include a radially extending flanged portion 98 having a first annular surface 100 and a second annular surface 102. The second annular surface 102 may be substantially frustoconically shaped.

In a seated configuration, the second annular surface 102 of the flanged portion 98 may be adjacent to, and sealingly engaged with, the tip 50 of the injector body 40. The flanged portion 98 may define a conically shaped space or gap 104 between the tip 50 of the injector body and the tip portion 88 of the injector valve 42. In the seated configuration, the fuel injection ports 64 may be in fluid communication with the gap 104. In addition, in the seated configuration, the flanged portion 98 may prevent the fuel injection ports 64 from fluidly communicating with the second portion 68 of the chamber 53 and with the second intake port 76. The gap 104 ensures that the tip portion 88 of the injector valve 42 does not contact the fuel injection ports 64, which can help ensure that contaminant build-up or surface abnormalities on the tip portion 88 do not affect the performance of the injection ports 64. Accordingly, the flanged portion 98 and the gap 104 may ensure better sealing of the injection ports 64 when the injector valve 42 is in the seated configuration (FIG. 4A) and may provide better flow characteristics between the injection ports 64 and the second portion 68 of the chamber 53 when injector valve 42 is in an unseated configuration (FIG. 4B)

The biasing member 44 may be located in the first portion 66 of the chamber 53. In one configuration, the biasing member 44 is a helical spring concentrically disposed about the first stem portion 86a of the injector valve 42, such that the first stem portion 86a axially supports the biasing member 44. The biasing member 44 may include a first end 106 disposed adjacent the control valve assembly 46 and a second end 108 disposed adjacent the shoulder 83. In this way, the biasing member 44 biases the injector valve 42 along the longitudinal axis 56 such that the flange portion 98 of the injector valve 42 is sealingly engaged with the tip 50 of the injector body 40, as previously described.

The control valve assembly 46 may prevent fluid communication between the first intake port 74 and the first portion 66 of the chamber 53 in a first configuration (FIG. 4A) and may allow fluid communication between the first intake port 74 and the first portion 66 of the chamber 53 in a second configuration (FIG. 4B).

Figure 5:
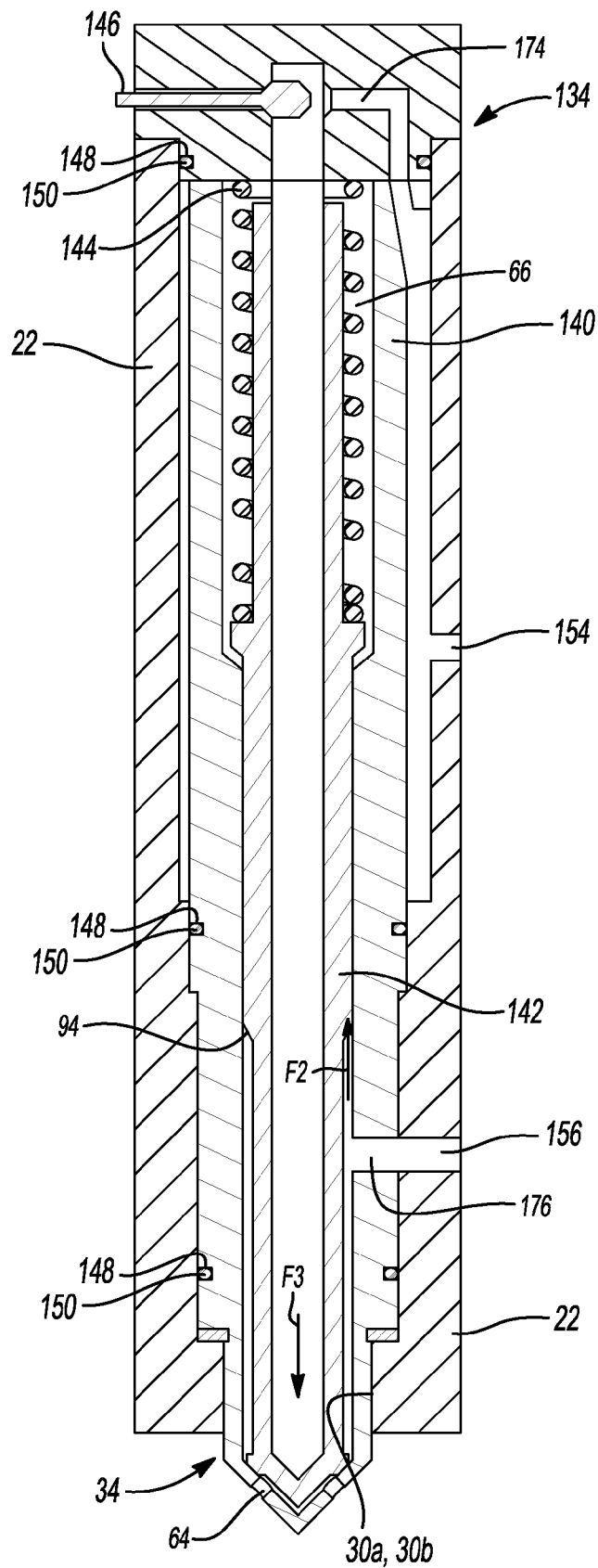
FIG. 5 is a cross-sectional view of a fuel injector integrated into a cylinder in accordance with the principles of the present disclosure.

With reference to FIG. 5, another fuel injector 134 is provided. The fuel injector 134 may include an injector body 140, a needle or injector valve 142, a biasing member 144, and a control valve assembly 146. In view of the substantial similarity in structure and function of the components associated with the fuel injector 34 with the fuel injector 134, like reference numerals are used hereinafter to identify like components while like reference numerals having one hundred (100) added to the number of the corresponding element of the fuel injector 34 are used to identify those components that have been modified.

The fuel injector 134 may generally be integrated with the cylinder head 22. The outer surface of the injector body 140 may include at least one annular channel 148. In one configuration, the injector body 140 includes two channels 148. It will appreciated, however, that the injector body may include less or more than two channels 148 within the scope of the present teachings. An O-ring 150 or other suitable sealing feature may be disposed within each of the channels 148 to seal a junction of the injector body 140 and the cylinder head 22.

The cylinder head 22 may include a third intake port 154 and a fourth intake port 156. The fuel injector 134 may be disposed within one of the bores 30a, 30b of the cylinder head 22 such that the O-rings 150 or other suitable seals provide a sealed interface between the cylinder head 22 and the injector body 140. In an assembled configuration, the third intake port 154 of the cylinder head 22 may be in fluid communication with the first intake port 174, and the fourth intake port 156 may be in fluid communication with the second intake port 176 in the injector body 140. In the assembled configuration, at least one of the O-rings 150 may prevent fluid communication between the third intake port 154 and the fourth intake port 156.

With reference to FIG. 6A, a fuel pressure regulating system 200, including another configuration of a fuel injector 234, is shown. The fuel pressure regulating system 200 may include the injector 234, an oil pump 236, a first fuel tank 238 (e.g., a liquid natural gas tank), a fuel pump 240 (e.g., a liquid natural gas pump), a second fuel tank 242 (e.g., a compressed natural gas pump), a fuel pressure regulator 244, and a pressure relief valve 246.

The injector 234 may be substantially similar to the fuel injectors 34, 134, except as otherwise described herein. Accordingly, like reference numerals are used to identify like components while like reference numerals having two hundred (200) added to the number of the corresponding element of the fuel injector 34 are used to identify those components that have been modified.

The injector 234 may include an accumulator 250. As illustrated, the accumulator 250 may include an axially extending flange or wall 252 extending from a distal end 254 of the base portion 248 of the injector 234. In this regard, the wall 252 may define a chamber 256. In an assembled configuration, the wall 252 may be coupled to a proximal end 258 of an injector body 260, such that the chamber 256 may be in fluid communication with a second intake port 261 and with the second portion 68 of the chamber 53. In one configuration, the wall 252 may be substantially cylindrical such that the chamber 256 annularly surrounds, and is concentrically located relative to, the injector valve 42. The wall 252 may have an inner diameter D7 that is greater than the diameter D4 of the second portion 68 of the chamber 53 and is greater than the diameter D5 of second stem portion 86b of the injector valve 42.

In the assembled configuration, the diameter D7 of the chamber 256 may define an accumulator volume that is larger than a volume that would otherwise be defined by the diameter D4 of the second portion 68 of the chamber 53 (FIG. 4A). As will be explained in more detail below, the accumulator 250, including the accumulator volume of the chamber 256, may allow the injector 234 to deliver fuel through the injection ports 64 and into the chamber 24 of the cylinder 12 in a very short period of time. For example, the accumulator 250 may allow the injector 234 to deliver fuel to the chamber 24 in approximately thirty (30) crank degrees, such that, of the seven hundred twenty (720) crank degrees in a four-cycle engine, one hundred percent (100%) of the fuel may be delivered in four percent (4%) of the total cycle time. Placing the accumulator 250, including the chamber 256 directly in line with, and concentric to, the injector valve 42 and the second portion 68 of the chamber 53, can help to avoid line losses and other inefficiencies during operation of the injector 234.

The pressure relief valve 246 may include a housing 262, a valve member 264, and a biasing member 265. The housing 262 may define an inner chamber 266, and may include a first inlet port 268, a second inlet port 270, a first outlet port 272, and a second outlet port 274. The first inlet port 268 may be an oil inlet port in fluid communication with the chamber 266 and with the oil pump 236. The second inlet port 270 may be a compressed natural gas port in fluid communication with the chamber 266 and with the fuel pressure regulator 244. The first outlet port 272 may be a compressed natural gas port in fluid communication with the second intake port 261 of the fuel injector 234. The second outlet port 274 may be a compressed natural gas port in fluid communication with the first fuel tank 238.

The valve member 264 may be disposed within the chamber 266 of the housing 262 and may include a body portion 276 and a stem portion 278. In an assembled configuration, the body portion 276 may sealingly engage an inner surface 280 of the housing 262, such that the body portion 276 divides the chamber 266 into a first portion 266a and a second portion 266b. As illustrated, the first inlet port 268 may be in fluid communication with the first portion 266a of the chamber 266, while the second inlet port 270 and the first and second outlet ports 272, 274 may be in fluid communication with the second portion 266b of the chamber 266.

The stem portion 278 of the valve member 264 may extend from the body portion 276. In an assembled configuration, the stem portion 278 may be aligned with the second outlet port 274, such that the stem portion 278 prevents fluid communication between the second portion 266b of the chamber 266 and second outlet port 274, as will be described in more detail below.

The biasing member 265 may be disposed within the chamber 266 and may be a helical spring disposed between the housing 262 and the valve member 264. The biasing member 265 biases the stem portion 278 away from the second outlet port 274, to allow fluid communication between the second outlet port 274 and the second portion 266b of the chamber 266.

A first flow path 282 (e.g., a first conduit) may extend from and between the oil pump 236, the first inlet port 268, and the first intake port 74. Accordingly, the first flow path 282 may allow the oil pump 236 to fluidly communicate with both the first intake port 74 of the injector 234 and with the first inlet port 268 of the pressure relief valve 246.

A second flow path 284 (e.g., a second conduit) may extend from and between the second inlet port 270 and the second outlet port 274. The second flow path 284 may include the first fuel tank 238, the fuel pump 240, the second fuel tank 242, and the fuel pressure regulator 244. Accordingly, and as will be described in more detail below, the second flow path 284 allows the second inlet port 270 to fluidly communicate with the second outlet port 274.

A third flow path 286 (e.g., a third conduit) may extend from and between the first outlet port 272 and the second intake port 261 of the fuel injector 234. Accordingly, the third flow path 286 allows the first outlet port 272 to fluidly communicate with the second intake port 261.

With reference to FIG. 6B, another configuration of a fuel pressure regulating system 300 is shown. The fuel pressure regulating system 300 is substantially identical to the fuel pressure regulating system 200, except as described below. Accordingly, like reference numerals are used to describe like features and components. Similar features will not be described again in detail.

The fuel pressure regulating system 300 may include the injector 234, the oil pump 236, the first fuel tank 238, the fuel pump 240, the second fuel tank 242, the fuel pressure regulator 244, and a pressure relief valve 246a. A third flow path 286a (e.g., a third conduit) may extend from and between the second flow path 284 and the second intake port 261 of the injector 234. Accordingly, the third flow path 286a may allow the second outlet port 274 to fluidly communicate with the second intake port 261.

With reference to FIG. 7, a fuel pressure regulating system 400, including another configuration of a fuel injector 434, is shown. The fuel pressure regulating system 400 may include the injector 434, the oil pump 236, the first fuel tank 238, the fuel pump 240, the second fuel tank 242, the fuel pressure regulator 244, and the pressure relief valve 246.

The injector 434 may be substantially similar to the fuel injectors 34, 134, 232 except as otherwise described herein. Accordingly, like reference numerals are used to identify like components while like reference numerals having four hundred (400) added to the number of the corresponding element of the fuel injector 34 are used to identify those components that have been modified.

The injector 434 may include an injector body 440, an injector valve 442, and a biasing member 444. The injector valve 442 may extend from a proximal end 478 to a distal end 480 along the longitudinal axis 56. A first stem portion 486a of the injector valve 442 may include a bore 484 extending from an annular flange or shoulder 483 to the proximal end 478 of the injector valve 442. The first stem portion 486a of the injector valve 442 may disposed within the first portion 466 of the chamber 453, such that the first stem portion 486a, including the shoulder 483, separates a proximal end 491 of the first portion 466 from a distal end 493 of the first portion 466. The shoulder 483 may include a through hole or aperture 490 in fluid communication with the proximal and distal ends 491, 493 of the chamber 453. The first stem portion 486a may be sealingly disposed within the first portion 466 of the chamber 453, such that the first stem portion 486a prevents the proximal portion 491 of the chamber 453 from fluidly communicating with the distal portion 493 of the chamber 453, other than through the aperture 490.

The biasing member 44 may be located within the bore 484. In one configuration, the biasing member 44 is concentrically disposed within the bore 484 of the first stem portion 486a, such that the second end 108 of the biasing member 44 engages the shoulder 483. In this way, the biasing member 44 biases the injector valve 442 along the longitudinal axis 56.

Operation of the fuel injectors 34, 134, 234, 434 will now be described in detail with reference to FIGS. 4A-7. Operation of the fuel injectors will be described relative to a force F1 applied by the biasing member 44, 144, 444, a force F2 applied by a first fluid supplied from the intake port 76, 176, 261, and a force F3 applied by a second fluid supplied from the intake port 74, 174. As described above, the fuel injectors 34, 134, 234, 434 may be disposed within the cylinder block 20, the cylinder head 22, or the intake port 38 such that the fuel injection ports 64 fluidly communicate with the chamber 24.

With reference to FIG. 4A, in a first mode of operation, the control valve assembly 46 may be in a closed configuration, thereby preventing fluid communication between the first intake port 74 and the first portion 66 of the chamber 53. In the first mode of operation, the biasing member 44 may apply the force F1 on the injector valve 42. However, in contrast to FIG. 4A, in the first mode of operation a high pressure fluid (e.g., engine oil from a motor vehicle) may not apply the force F3 on the proximal end 78 of the injector valve 42. Thus, by applying the force F1 in the first mode of operation, the biasing member 44 biases the tip portion 88 into engagement with the tip 50 of the injector body 40, such that the second annular surface 102 prevents fluid communication between the fuel injection ports 64 and the second intake port 76. In this way, the biasing member 44 may act as a fail-safe mechanism to prevent fluid communication between the fuel injection ports 64 and the chamber 24 when the control valve assembly 46 is in the closed configuration and high-pressure fluid is not supplied to the first intake port 74 (e.g., when engine power is turned off).

With continued reference to FIG. 4A, in a second mode of operation, the control valve assembly 46 may be in an open configuration, thereby allowing fluid communication between the first intake port 74 and the first portion 66 of the chamber 53. In the second mode of operation, the biasing member 44 may apply the force F1 on the injector valve 42, and a high-pressure fluid (e.g., engine oil from a motor vehicle) may apply the force F3 on the proximal end 78 of the injector valve 42, to bias the tip portion 88 into engagement with the tip 50 of the injector body 40, such that the second annular surface 102 prevents fluid communication between the fuel injection ports 64 and the second intake port 76.

By injecting oil through the first intake port 74, proper lubrication of the control valve assembly 46 and cooling of the injector valve 42 and the injector body 40 may be ensured. In the second mode of operation, high-pressure gas, or other suitable fluid, may be supplied to the second portion 68 of the chamber 53 and/or to the chamber 256 of the accumulator 250 (FIG. 6A), respectively, as described above. The force F3 may be substantially opposite, and greater than, the force F2 provided by the high-pressure gas.

With reference to FIG. 4B, in a third mode of operation, the control valve assembly 46 may be in a closed configuration, thereby preventing fluid communication between the first intake port 74 and the first portion 66 of the chamber 53. High-pressure gas, or other suitable fluid, may be supplied from the second intake port 76, 176 to the second portion 68 of the chamber 53 and/or to the chamber 256 of the accumulator 250, respectively. The high-pressure gas may fill the annular gap between the injector valve 42 and the injector body 40 and may apply the force F2 on the shoulder 94 of the injector valve 42 to bias the tip portion 88 away from the tip 50 of the injector body 40, such that the fuel injection ports 64 are placed in fluid communication with the second portion 68 of the chamber 53 and with the second intake port 76. Accordingly, the force F2 may be substantially opposite, and greater than, the force F1 provided by the biasing member 44.

With reference to FIG. 6A, operation of the fuel pressure regulating system 200, including the fuel injector 234 and the pressure relief valve 246, will now be described in more detail. During operation of the fuel pressure regulating system 200, high-pressure oil may be supplied, or otherwise transported, through the first flow path 282. Specifically, high-pressure oil from the oil pump 236 may be supplied to the first intake port 74 of the fuel injector 234 and to the first inlet port 268 of the pressure relief valve 246. In this regard, operation of the fuel injector 234 may be substantially similar to operation of the fuel injectors 34, 134.

The high-pressure oil supplied to the first inlet port 268 of the pressure relief valve 246 and, thus, to the first portion 266a of the chamber 266, may apply a force on the valve member 264 that is opposite, and greater than, a force applied on the valve member 264 by the biasing member 265. In this way, the high-pressure oil may bias the stem portion 278 of the valve member 264 into a closed position relative to the second outlet port 274, such that the valve member 264 prevents fluid communication between the second outlet port 274 and the second portion 266b of the chamber 266.

Natural gas may be supplied or otherwise transported through the second flow path 284. Specifically, natural gas from the first fuel tank 238 may first be supplied to the second fuel tank 242 by the fuel pump 240. The natural gas may further be supplied or transported from the second fuel tank 242 to the fuel pressure regulator 244, and from the fuel pressure regulator 244 to the second inlet port 270 of the pressure relief valve 246.

The fuel pressure regulating system 200 may further include a controller 298 (e.g., an engine control unit). The controller 298 may be in communication with the oil pump 236, the fuel pump 240, the fuel pressure regulator 244, and/or with the injector 234, to control various characteristics (e.g., pressure, quantity, and duration) of the supply of oil and natural gas to the first and second inlet ports 268, 270, respectively. If the supply of high-pressure oil to the first inlet port 268 of the pressure relief valve 246 is terminated or otherwise reduced below a predetermined level, the force of the biasing member 265 and/or a force created on the valve member 264 by the natural gas within the second portion 266b of the chamber 266 may urge the stem portion 278 of the valve member 264 away from the second outlet port 274, such that the second outlet port is in fluid communication with the second portion 266b of the chamber 266. In this way, the pressure relief valve 246 can operate as a fail-safe mechanism, allowing for the movement of natural gas from the fuel pressure regulator 244 to the first fuel tank 238, when natural gas is supplied to the second inlet port 270 and oil is not supplied, or is otherwise supplied at a pressure that is lower than a predetermined value, to the first inlet port 268.

With reference to FIG. 6B, operation of the fuel pressure regulating system 300, including the fuel injector 234 and the pressure relief valve 246a, will now be described in more detail. Operation of the fuel pressure regulating system 300 may be substantially similar to operation of the fuel pressure regulating system 200, except as otherwise described herein.

Natural gas may be supplied or transported from the second flow path 284 to the second intake port 261 of the injector 234 and to the second portion 266b of the of chamber 266 of the pressure relief valve 246a. Specifically, the natural gas may be transported from the first fuel tank 238 to the second fuel tank 242, from the second fuel tank 242 to the fuel pressure regulator 244, and from the fuel pressure regulator 244 to the third flow path 286a, prior to entering the second intake port 261 of the injector 234 and the second inlet port 270 of the pressure relief valve 246a.

If the supply of high-pressure oil to the first inlet port 268 of the pressure relief valve 246a is terminated or otherwise reduced below a predetermined level, the force of the biasing member 265 and/or a force created on the valve member 264 by the natural gas within the second portion 266b of the chamber 266 may urge the stem portion 278 of the valve member 264 away from the second outlet port 274, such that the second outlet port is in fluid communication with the second portion 266b of the chamber 266. In this way, the pressure relief valve 246a can operate as a fail-safe mechanism, allowing for the movement of natural gas from the fuel pressure regulator 244 to the first fuel tank 238, when natural gas is supplied to the second inlet port 270 and oil is not supplied, or is otherwise supplied at a pressure that is lower than a predetermined value, to the first inlet port 268.

With reference to FIG. 7, operation of the fuel pressure regulating system 400, including the fuel injector 434 will now be described in more detail. Operation of the fuel pressure regulating system 400 and the fuel injector 434 may be substantially similar to the operation of the fuel pressure regulating systems 200, 300 and operation of the fuel injectors 34, 134, 234. Accordingly, only the differences will be discussed in detail herein. During operation of the fuel pressure regulating system 400, high-pressure oil may be supplied, or otherwise transported, through the first flow path 282. Specifically, high-pressure oil from the oil pump 236 may be supplied to the first intake port 74 of the fuel injector 434.

In a third mode of operation, the control valve assembly 46 may be in an open configuration and high-pressure oil (e.g., engine oil from a motor vehicle), or other suitable fluid, may be supplied to the proximal end 491 of the chamber 453 from the first intake port 74. The high-pressure oil may then flow into the bore 484 of the injector valve 442 and apply the force F3 on the shoulder 483 of the injector valve 442. Accordingly, the high-pressure oil will bias and translate the tip portion 488 of the injector valve 442 into engagement with the tip 450 of the injector body 440, such that the flanged portion 498 prevents fluid communication between the fuel injection ports 64 and the second intake port 261. During translation of the injector valve 442 from the open position (e.g., FIG. 4B) to the closed position illustrated in FIG. 7, the high-pressure oil supplied to the bore 484 may flow through the aperture 490 and into the distal end 493 of the chamber 453. The high-pressure oil flowing into the distal end 493 of the chamber 453 may apply a force F4 on the shoulder 483 of the injector valve 442. The force F4 may be opposite the force F3, such that the high-pressure oil and the force F4 act to dampen or otherwise slow the movement of the injector valve 442 relative to the injector body 440.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A fuel injector comprising:
   an injector body defining a longitudinally extending chamber, the injector body having a first intake port, a second intake port and a fuel injection port; and
   an injector valve disposed within the longitudinally extending chamber, the injector valve including a longitudinally extending aperture in fluid communication with the longitudinally extending chamber, the injector valve being configured to prevent fluid communication between the first intake port and the second intake port and to prevent fluid communication between the fuel injection port and the second intake port; and
   a control valve at least partially disposed in the injector body and operable to control fluid communication between the first intake port and the longitudinally extending chamber.

2. The fuel injector of claim 1, further comprising a biasing member disposed within the longitudinally extending chamber, wherein the biasing member is configured to bias the injector valve into engagement with the injector body to prevent fluid communication between the fuel injection port and the second intake port.

3. The fuel injector of claim 1, wherein the injector valve includes an annular flanged portion, and wherein the annular flanged portion is operable to engage the injector body to define a gap between the injector valve and the injector body.

4. The fuel injector of claim 1, wherein the injector valve is moveable between a first position in which the injector valve prevents fluid communication between the fuel injection port and the second intake port, and a second position in which the injector valve allows fluid communication between the fuel injection port and the second intake port.

5. The fuel injector of claim 4, wherein the control valve is operable to allow fluid communication between the first intake port and the longitudinally extending chamber to move the injector valve to the first position and thereby prevent fluid communication between the fuel injection port and the second intake port.

6. The fuel injector of claim 4, wherein the control valve is operable to prevent fluid communication between the first intake port and the longitudinally extending chamber to move the injector valve to the second position and thereby allow fluid communication between the fuel injection port and the second intake port.

7. The fuel injector of claim 1, wherein the first intake port is an oil intake port and the second intake port is a natural gas intake port.

8. The fuel injector of claim 1, wherein the injector valve includes an annular flanged portion having an aperture, the aperture in fluid communication with the longitudinally extending aperture and the longitudinally extending chamber.

9. The fuel injector of claim 1, wherein the longitudinally extending chamber includes first and second portions at least partially defined by the injector valve and the injector body, the injector valve preventing fluid communication between the first and second portions.

10. The fuel injector of claim 1, wherein the injector body includes a conically shaped end portion.

11. The fuel injector of claim 10, wherein the injector valve includes a conically shaped tip portion disposed within the end portion.

12. The fuel injector of claim 11, wherein the tip portion includes an annular flanged portion operable to engage the end portion.

13. A fuel injector comprising:
    an injector body defining a longitudinally extending chamber, the injector body having a first intake port, a second intake port, and a fuel injection port, the first intake port being configured to deliver a first fluid into the longitudinally extending chamber to apply a first force, the second intake port being configured to deliver a second fluid into the longitudinally extending chamber to apply a second force, the second force opposing the first force;
    an injector valve disposed within the longitudinally extending chamber and configured to prevent fluid communication between the first intake port and the second intake port, the injector valve including a longitudinally extending aperture in fluid communication with the longitudinally extending chamber; and
    a control valve, wherein the control valve allows the first fluid to flow through the first intake port to the longitudinally extending chamber when the control valve is open, and the control valve prevents the first fluid from flowing through the first intake port to the longitudinally extending chamber when the control valve is closed.

14. The fuel injector of claim 13, wherein the first fluid applies the first force in a first direction, and the second fluid applies the second force in a second direction that is opposite the first direction.

15. The fuel injector of claim 14, further comprising a biasing member disposed within the longitudinally extending chamber, wherein the biasing member is configured to apply a biasing force to the injector valve in the first direction to bias the injector valve into engagement with the injector body and thereby prevent fluid communication between the fuel injection port and the second intake port.

16. The fuel injector of claim 15, wherein a sum of the first force and the biasing force is greater than the second force, such that the injector valve moves in the first direction and engages the injector body to prevent fluid communication between the fuel injection port and the second intake port when the first fluid flows through the first intake port.

17. The fuel injector of claim 13, wherein the injector valve includes an annular flanged portion, and wherein the annular flanged portion is operable to engage the injector body to define a gap between the injector valve and the injector body.

18. The fuel injector of claim 13, wherein the first intake port is an oil intake port and the second intake port is a natural gas intake port.

19. A method for operating a fuel injector, the fuel injector including an injector body defining a longitudinally extending chamber, and an injector valve slidably disposed within the longitudinally extending chamber, the injector body having a first intake port, a second intake port, and a fuel injection port, the method comprising:

allowing a first fluid to flow into the longitudinally extending chamber through the first intake port to apply a first force on the injector valve in a first direction, such that the injector valve moves in the first direction within the longitudinally extending chamber and engages the injector body to prevent fluid communication between the second intake port and the fuel injection port;

preventing the first fluid from flowing into the longitudinally extending chamber through the first intake port and applying the first force on the injector valve in the first direction; and allowing a second fluid to flow into the longitudinally extending chamber through the second intake port to apply a second force on the injector valve in a second direction opposite the first direction, such that the injector valve moves in the second direction within the longitudinally extending chamber to allow fluid communication between the second intake port and the fuel injection port, wherein the second fluid is different than the first fluid.

20. The fuel injector of claim 1, wherein the control valve allows fluid communication between the first intake port and the longitudinally extending chamber when the control valve is open, and the control valve prevents fluid communication between the first intake port and the longitudinally extending chamber when the control valve is closed.

21. The fuel injector of claim 13, wherein the control valve is at least partially disposed in the injector body.

22. The method of claim 19, wherein the fuel injector further includes a control valve at least partially disposed in the injector body and operable to control fluid communication between the first intake port and the longitudinally extending chamber, the method further comprising preventing the first fluid from flowing into the longitudinally extending chamber through the first intake port using the control valve.

* * * * *